(12) United States Patent
Hsiang et al.

(10) Patent No.: US 8,107,043 B2
(45) Date of Patent: Jan. 31, 2012

(54) LIQUID CRYSTAL PANEL HAVING ARC-SHAPED DOMAIN-DIVIDING PROTRUSIONS AND SLITS

(75) Inventors: Rui-Jie Hsiang, Miao-Li (TW); Chih-Lung Lin, Miao-Li (TW); I-An Yao, Miao-Li (TW); Chueh-Ju Chen, Miao-Li (TW); Chiu-Lien Yang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 247 days.

(21) Appl. No.: 12/455,074

(22) Filed: May 28, 2009

(65) Prior Publication Data

US 2009/0296035 A1    Dec. 3, 2009

(30) Foreign Application Priority Data

May 30, 2008    (TW) .............................. 97120035 A (51) Int. Cl.
*G02F 1/1337* (2006.01)
(52) U.S. Cl. ...................................... 349/129
(58) Field of Classification Search .................. None
See application file for complete search history.

(56) References Cited

U.S. PATENT DOCUMENTS

| | | | |
|---|---|---|---|
| 6,618,109 B2* | 9/2003 | Hidehira et al. | 349/141 |
| 7,139,055 B2* | 11/2006 | Ogishima et al. | 349/129 |
| 7,151,583 B2 | 12/2006 | Ahn et al. | |
| 7,268,848 B2* | 9/2007 | Chen et al. | 349/141 |
| 2002/0085152 A1* | 7/2002 | Chuang et al. | 349/123 |
| 2003/0107695 A1* | 6/2003 | Kubo et al. | 349/129 |
| 2005/0078250 A1 | 4/2005 | Chen et al. | |
| 2005/0078251 A1* | 4/2005 | Chen et al. | 349/129 |
| 2005/0105015 A1* | 5/2005 | Chen et al. | 349/84 |
| 2005/0128407 A1* | 6/2005 | Lee et al. | 349/141 |
| 2005/0128409 A1* | 6/2005 | Lee | 349/141 |
| 2006/0023149 A1* | 2/2006 | Lin et al. | 349/129 |
| 2006/0139540 A1* | 6/2006 | Lu et al. | 349/129 |
| 2007/0139598 A1* | 6/2007 | Choi et al. | 349/139 |

FOREIGN PATENT DOCUMENTS

TW    200949360 A    * 12/2009

* cited by examiner

*Primary Examiner* — Mike Stahl
(74) *Attorney, Agent, or Firm* — Altis Law Group, Inc.

(57) ABSTRACT

A liquid crystal panel includes a first substrate, a second substrate disposed opposite to the first substrate, and a liquid crystal layer sealed between the first substrate and the second substrate including a plurality of liquid crystal molecules. The first substrate includes a plurality of first region-dividing structures; the second substrate includes a plurality of second region-dividing structures. The first substrate, the second substrate and the liquid crystal layer form a plurality of pixel elements, each of the pixel elements is divided into a plurality of regions by the first region-dividing structures and the second region-dividing structures, and the liquid crystal molecules have gradually and continuously changed alignments in at least one of the regions.

13 Claims, 10 Drawing Sheets

LIQUID CRYSTAL PANEL HAVING ARC-SHAPED DOMAIN-DIVIDING PROTRUSIONS AND SLITS

BACKGROUND

1. Technical Field

The present invention relates to a liquid crystal panel, and more particularly to a liquid crystal panel with a wide viewing angle and a high display quality.

2. Description of Related Art

Liquid crystal molecules in a liquid crystal panel do not have an illuminant property. The liquid crystal panel displays color using an electric field to control twist of the liquid crystal molecules to change the light permeability coordinating with a color filter and polarizers. The type of the liquid crystal molecules of a typical liquid crystal panel can be a twist nematic type or a super twist nematic type, and the range of the viewing angle of the liquid crystal panel is narrow. Therefore, an optical compensator may be added to the liquid crystal panel to solve the problem of a narrow viewing angle. Another typical technique is a four-domain vertical alignment technique, which divides each pixel element into four domains by separately disposing a plurality of protrusions and slits on internal surfaces of two substrates facing each other. Liquid crystal molecules in each domain align along four specific directions to obtain a wider viewing angle.

Figure 10:
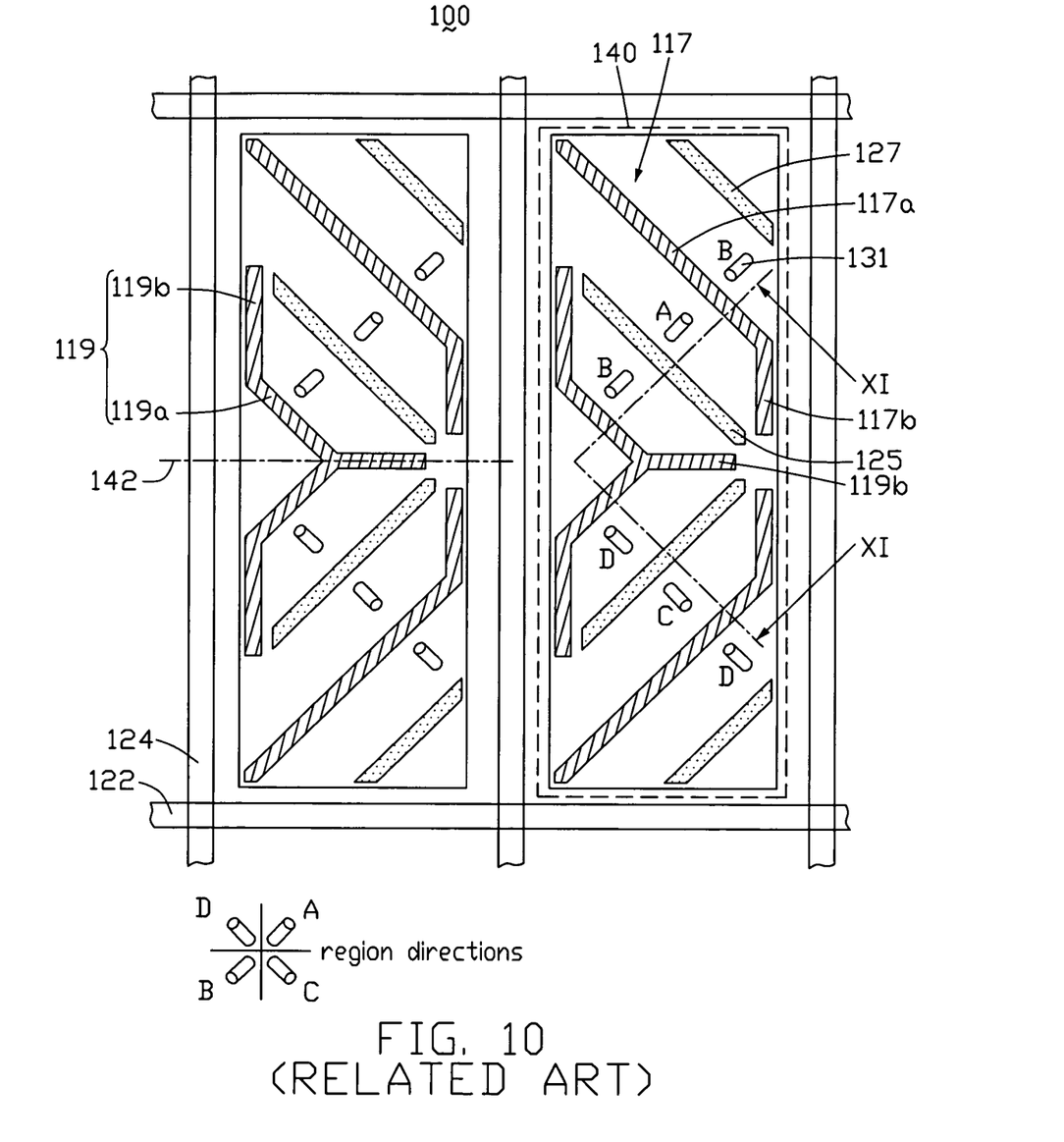
FIG. 10 illustrates a plane view of a portion of a conventional four-domain vertical alignment liquid crystal panel.
Figure 11:
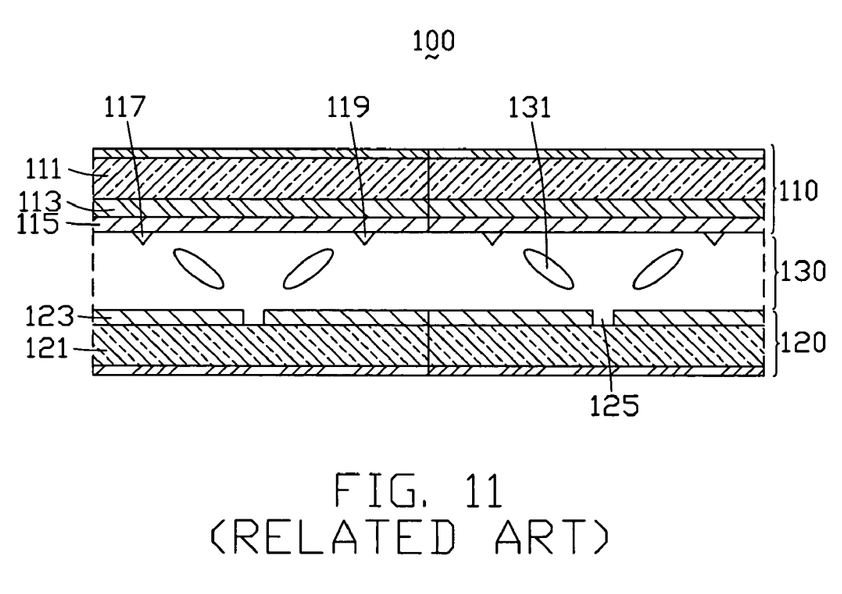
FIG. 11 illustrates a cross-sectional view taken along a cross-sectional line XI-XI.

Referring to FIGS. 10 and 11, FIG. 10 illustrates a plane view of a portion of a typical four-domain vertical alignment liquid crystal panel, and FIG. 11 illustrates a cross-sectional view taken along line II-II of FIG. 10. The typical four-domain vertical alignment liquid crystal panel 100 includes a first substrate 110, a second substrate 120 opposite to the first substrate 110, and a liquid crystal layer 130 sealed between the first substrate 110 and the second substrate 120. The liquid crystal 130 is composed of anisotropy liquid crystal molecules 131 with a negative dielectric constant.

The first substrate 110 includes a first base 111, a color filter 113, a common electrode 115, and a plurality of first and second protrusions 117 and 119. The color filter 113, the common electrode 115, and the first and second protrusions 117 and 119 are disposed in sequence from the first base 111 toward the liquid crystal layer 130, and are placed between the first base 111 and the liquid crystal layer 130. The color filter 113 includes a plurality of red color filter elements (not shown), green color filter elements (not shown) and blue color filter elements (not shown), which are arranged periodically.

The second substrate 120 includes a second base 121, a plurality of parallel scan lines 122, a plurality of parallel data lines 124 vertically intersected and isolated with the scan lines 122, a plurality of pixel electrodes 123, and a plurality of first and second slits 125 and 127 formed on the pixel electrodes 123. The scan lines 122, the data lines 124, the pixel electrodes 123, and the first and second slits 125 and 127 are formed on a side of the second base 122 adjacent to the liquid crystal layer 130. The data lines 124 and the scan lines 122 intersect to define a plurality of pixel elements 140. The pixel electrodes 123 correspond to the pixel elements 140. The pixel elements 140 respectively correspond to the red, green or blue color filter elements.

Each pixel element 140 includes two first protrusions 117, a second protrusion 119, two first slits 125 and two second slits 127.

A midline of the pixel element 140 parallel to the scan lines 122 is referred as a symmetry axis 142. The two first protrusions 117 are symmetrical to the symmetry axis 142. Each first protrusion 117 includes a straight bar 117a and a first extension portion 117b. The first extension portion 117b is vertical to the symmetry axis 142 and is located along an edge of the middle region of the pixel element 140. An acute angle is formed between the straight bar 117a and the symmetry axis 142. One end of the straight bar 117a is connected to the first extension portion 117b, and the other end of the straight bar 117a extends to one corner of the pixel element 140.

The second protrusion 119 is located in the middle region of the pixel element 140 and is symmetrical to the symmetry axis 142. The second protrusion 119 includes a V-shaped portion 119a and three second extension portions 119b. Two sides of the V-shaped portion 119a are respectively parallel to the straight bars 117b. One of the second extension portions 119b and the V-shaped portion 119a are combined in a Y shape. The other two of the extension portions 119b are respectively connected to two ends of the V-shaped portion 119a, and are vertical to the symmetry axis 142, i.e. the two second extension portions 119b are parallel to the two first extension portions 117b and are located along another edge of the middle region of the pixel element 140.

The two first slits 125 are symmetrical to the symmetry axis 142, and are located between the two first protrusions 117 and the second protrusion 119. The two first slits 125 are respectively parallel to the straight bars 117a of the two first protrusions 117 and are substantially arranged in a V shape.

The two second slits 127 are symmetrical to the symmetry axis 142, and are in a straight bar shape. The second slits 127 are respectively parallel to the two straight bars 117a and are located on another two corners of the pixel element 140. The two first protrusions 117 separate the two first slits 125 and the two second slits 127.

The pixel element 140 is divided into a plurality of regions according to the alignments of the liquid crystal molecules 131. The two first slits 125 and the two straight bars 117a define a region A and a region C, and the alignments of the liquid crystal molecules 131 in the A region and the C region are symmetrical to each other. The two first slits 125 and the V-shaped portion 119a define a region B and a region D, and the alignments of the liquid crystal molecules 131 in the region B and the region D are symmetrical to each other. The two straight bars 117a and the two second slits 127 define a region B and a region D symmetrical to the symmetry axis 142. The first extension portions 117b and the second extension portions 119b can make the alignments of the liquid crystal molecules 131 on the edge of the pixel element 140 regularly, thereby avoiding generating a defect of dark lines due to irregular alignments of the liquid crystal molecules 131.

According to the aforementioned description, the pixel element 140 is divided into four regions including the regions A, B, C and D by the first protrusions 117, the second protrusion 119, the first slits 125 and the second slits 127. When a voltage is not applied to the liquid crystal panel 100, the long axis of each liquid crystal molecule 131 is arranged along a direction vertical to the substrate 110 and 120 under the effect of alignment films (not shown) on two inner sides of the liquid crystal layer 130.

When the voltage is applied to the common electrode 115 and the pixel electrodes 123, an electric field substantially vertical to the substrates 110 and 120 is generated between the substrate 110 and 120. In the pixel element 140, due to the existence of the first protrusions 117, the second protrusion 119, the first slits 125 and the second slits 127, the electric field directions adjacent to the first protrusions 117, the second protrusion 119, the first slits 125 and the second slits 127 are tilted, so that one end of the long axis of each liquid crystal molecule 131 tilts to the first protrusions 117 or the second protrusion 119, and the other end of the long axis of the liquid crystal molecule 131 tilts toward the first slits 125 or the second slits 127. As a result, the liquid crystal molecules 131 in the four regions A, B, C and D correspondingly have four alignments of different directions as shown in FIG. 11. Simultaneously, all of the liquid crystal molecules 131 in any region have substantially the same alignment. Thus the liquid crystal panel 100 achieves an effect of four-domain vertical alignment displaying.

However, for each of the liquid crystal molecules 131, a refractive index of the long axis is different from that of the short axis, and the alignments of the liquid crystal molecules 131 of the pixel element 140 are merely four directions substantially. Therefore, when viewing an image displayed by the liquid crystal panel 100 from different directions, especially viewing the image in a large viewing angle, the image is still visible. However, because the liquid crystal molecules 131 have the structural limitation and only have four-domain vertical alignments, the liquid crystal panel 100 may have a serious color-fading phenomenon and even have a whitening phenomenon, thus causing the liquid crystal panel 100 to have a poor display quality.

DETAILED DESCRIPTION

Figure 1:
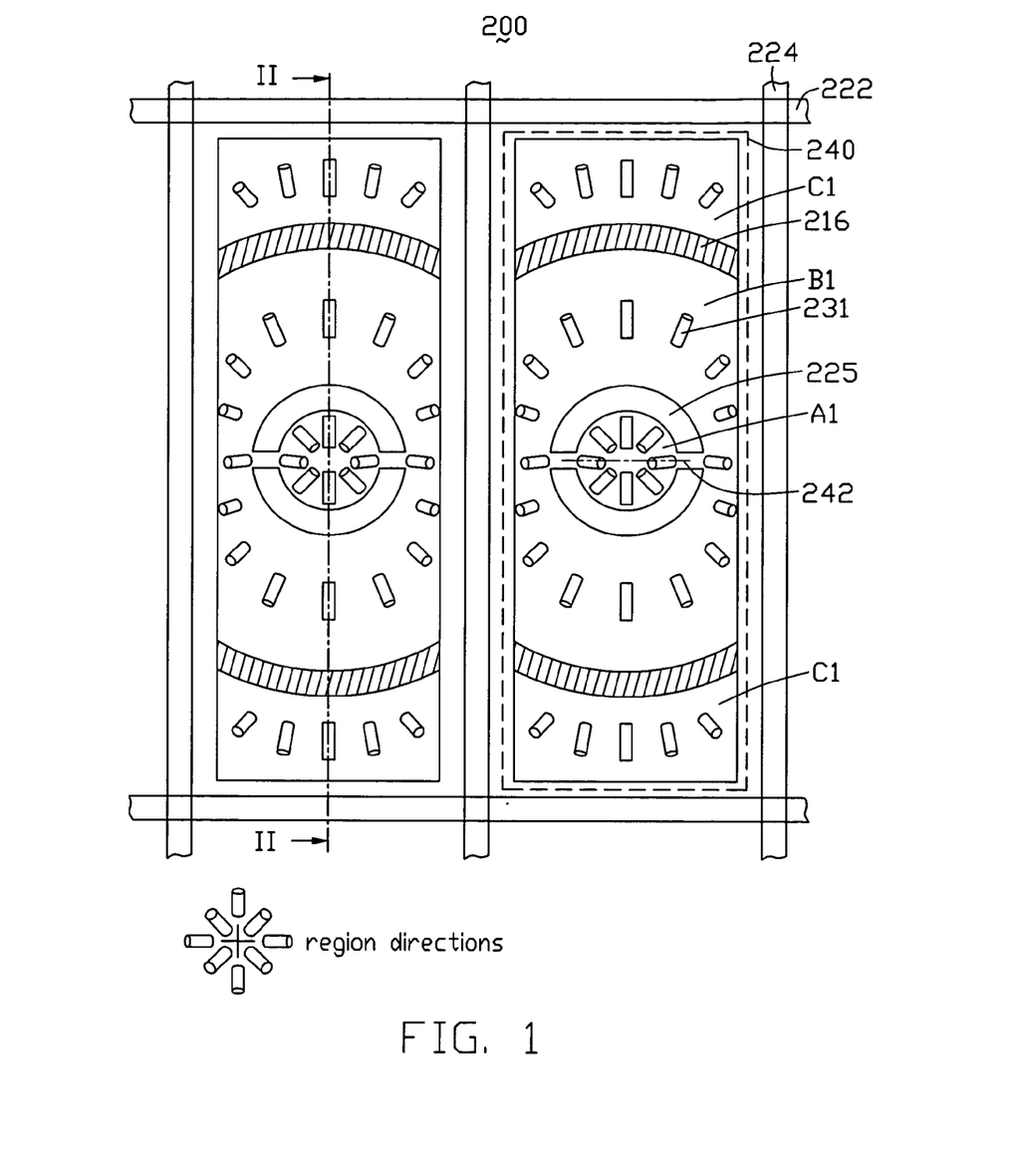
FIG. 1 illustrates a plane view of a portion of a liquid crystal panel in accordance with a first embodiment of the present disclosure, the liquid crystal panel including a plurality of protrusions.
Figure 2:
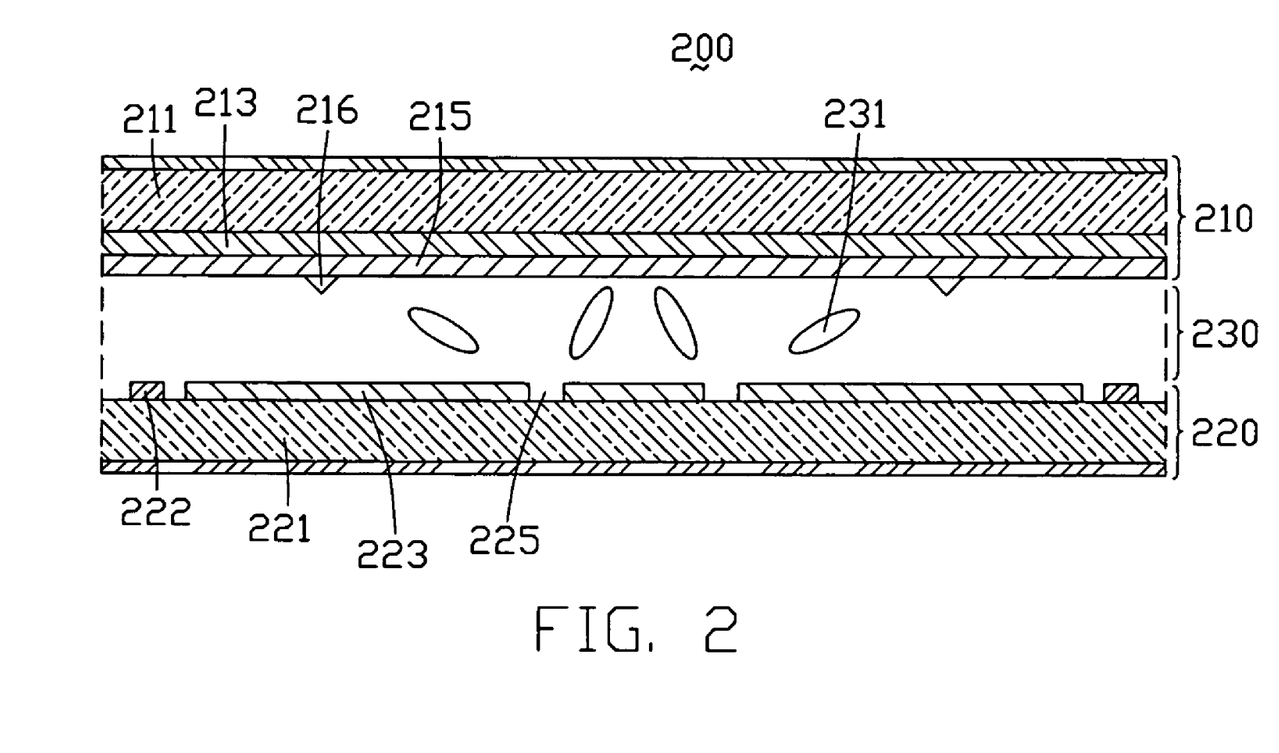
FIG. 2 illustrates a cross-sectional view taken along a cross-sectional line II-II of FIG. 1.

FIG. 1 illustrates a plane view of a portion of a liquid crystal panel 200 in accordance with a first embodiment of the present disclosure, and FIG. 2 illustrates a cross-sectional view taken along cross-sectional line II-II. The liquid crystal panel 200 includes a first substrate 210, a second substrate 220 disposed opposite to the first substrate 210, and a liquid crystal layer 230 sealed between the first substrate 210 and the second substrate 220. The liquid crystal layer 230 is composed of anisotropy liquid crystal molecules 231 with a negative dielectric constant.

The first substrate 210 includes a first base 211, a color filter 213, a common electrode 215 and a plurality of protrusions 216. The color filter 213, the common electrode 215 and the protrusions 216 are disposed in sequence from the first base 211 toward the liquid crystal layer 230, and are placed between the first base 211 and the liquid crystal layer 230. The color filter 213 includes a plurality of red color filter elements (not shown), green color filter elements (not shown) and blue color filter elements (not shown), which are arranged periodically.

The second substrate 220 includes a second base 221, a plurality of parallel scan lines 222, a plurality of parallel data lines 224 vertically intersected and isolated with the scan lines 222, a plurality of pixel electrodes 223 in a smallest rectangle region defined by the intersected scan lines 222 and the data lines 224, and a plurality of slits 225 formed on the pixel electrodes 223. The scan lines 222, the data lines 224, the pixel electrodes 223 and the slits 225 are formed on a side of the second base 221 adjacent to the liquid crystal layer 230. The data lines 222 and the scan lines 224 intersect to define a plurality of pixel elements 240, i.e. the pixel elements 240 are respectively disposed in the smallest regions defined by the intersected scan lines 222 and the data lines 224. The pixel elements 240 respectively correspond to the red, green or blue color filter elements.

Each pixel element 240 includes two protrusions 216 and two slits 225. A midline of the pixel element 240 parallel to the scan lines 222 is referred as a symmetry axis 242. The two protrusions 216 are symmetrical to the symmetry axis 242, and the two slits 225 are symmetrical to the symmetry axis 242.

Figure 3:
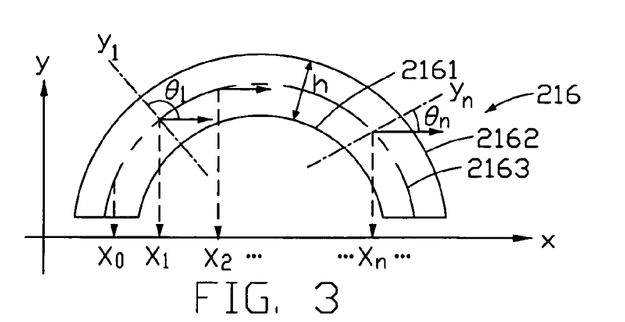
FIG. 3 is an enlarged view of the protrusion of the liquid crystal panel of FIG. 1.

Referring to FIG. 3, the protrusion 216 includes an inner arc 2161 and an outer arc 2162. The arc is defined as follows. A horizontal direction that is parallel to the scan lines 222 is referred as an x axis, a vertical direction is referred as a y axis and the protrusion 216 is located in the first quadrant. There is a width h between the inner arc 2161 and the outer arc 2162 of the protrusion 216, and the width h is about 10 µm. A curve between the inner arc 2161 and the outer arc 2162 is referred as an arc midline 2163, and a distance between the arc midline 2163 and the inner arc 2161 is the same as a distance between the arc midline 2163 and the outer arc 2162. Points on the arc midline 2163 defined as a start point $x_0$, points $x_1, x_2 \ldots x_n$ (n is a natural number) ..., etc. can be found along the direction of the x axis, and the distances from the points $x_1, x_2 \ldots x_n$ ... to the start point $x_0$ are gradually decreased in sequence. The arc midline 2163 at the point $x_n$ has a corresponding normal line $y_n$, and the arc midline 2163 at the point $x_1$ has a corresponding normal line $y_1$. The normal line $y_n$ corresponding to the point $x_n$ and the positive direction of the x axis has an included angle $\theta_n$. The normal line $y_1$ corresponding to the point $x_1$ and the positive direction of the x axis has an included angle $\theta_1$. As the value of n is increased, the included angle $\theta_n$ is regularly decreased, and the range of the included angle $\theta_n$ is between 0° and 180°, and is preferred between 30° and 150°.

In addition, the slits 225 are arcs. In each pixel element 240, the curve centers of protrusion 216 and the slit 225 are both adjacent to a side of the symmetry axis 242.

The two slits 225 have a smallest gap L. The gap L is substantially between 8 µm and 10 µm. In each pixel element 240, a region A1 is surrounded by the two slits 225, a region B1 is surrounded by the two protrusions 216, the two slits 225 and the two data lines 224, and a region C1 is surrounded by the two protrusions 216, the two scan lines 222 and the two data lines 224.

When the common electrode 215 and the pixel electrodes 223 of the liquid crystal panel 200 are not applied with a voltage, the long axes of the liquid crystal molecules 231 are arranged along a direction vertical to the substrates 210 and 220.

When the common electrode 215 and the pixel electrodes 223 of the liquid crystal panel 200 are applied with a voltage and the liquid crystal panel 200 is under operation, an electric field substantially vertical to the substrates 210 and 220 is generated between the substrate 210 and 220. In the pixel element 240, due to the existence of the two protrusions 216 and the slits 225, the electric field lines adjacent to the protrusions 216 and the slits 225 are tilted and are not vertical to the substrates 210 and 220, so that one end of the long axis of each liquid crystal molecule 231 tilts to the protrusions 216, and the other end of the long axis of the liquid crystal molecule 231 tilts to the slits 225, i.e. the liquid crystal molecules 231 are arranged along a direction from the adjacent slit 225 to the adjacent protrusion 216. As a result, the liquid crystal molecules 231 adjacent to the two protrusions 216 and the slits 225 in the regions A1, B1 and C1 correspondingly have gradually and continuously changed alignments as shown in FIG. 3. Specifically, in each pixel element 240, the liquid crystal molecules 231 having gradually and continuously changed alignments in the regions A1 and B1 are arranged and aligned in a shape of umbrella around the center of the region A1, to make the liquid crystal molecules 231 adjacent to the slits 225 basically have an inclination angle of 360 degrees. The liquid crystal molecules 231 adjacent to the protrusions 216 in the region C1 is aligned around the center of the pixel element 240, and have several gradually and continuously changed alignments from the data line 224 on one side of the pixel element 240 turning to the data line 224 on another side of the pixel element 240. Accordingly, when a voltage is applied to the liquid crystal panel 200, the liquid crystal molecules 231 in each pixel element 240 are basically radial about the center of the pixel element 240.

Because the protrusions 216 and the slits 225 of the liquid crystal panel 200 are both arcs, the included angle $\theta_n$ between the positive direction of the x axis and the normal line $y_n$ of the arc midline 2163 regularly varies, and in each pixel element 240 the two protrusions 216 and the slits 225 are symmetrical to the symmetry axis 242 and divide the pixel element 240 into regions A1, B1 and C1, so that the liquid crystal molecules 231 have several gradually and continuously changed alignments. When an observer views the liquid crystal panel 200 at any angle, substantially the same image displaying effect is obtained. Thus, the color-fading phenomenon and the whitening phenomenon are greatly improved while viewing at a wide viewing angle, thereby enhancing the displaying quality of the liquid crystal panel 200.

In addition, because the protrusions 216 and the slits 225 are both arcs, as long as the liquid crystal molecules are tilted under action of the electric field generated between the pixel electrode 223 and the common electrode 215, the liquid crystal panel 200 is on a bright state. Therefore, it can effectively prevent the problem that the bright state is presented only when the liquid crystal molecules tilt to the four specific directions, so that when the error alignment occurs, the liquid crystal panel 200 has a poor displaying quality.

Figure 4:
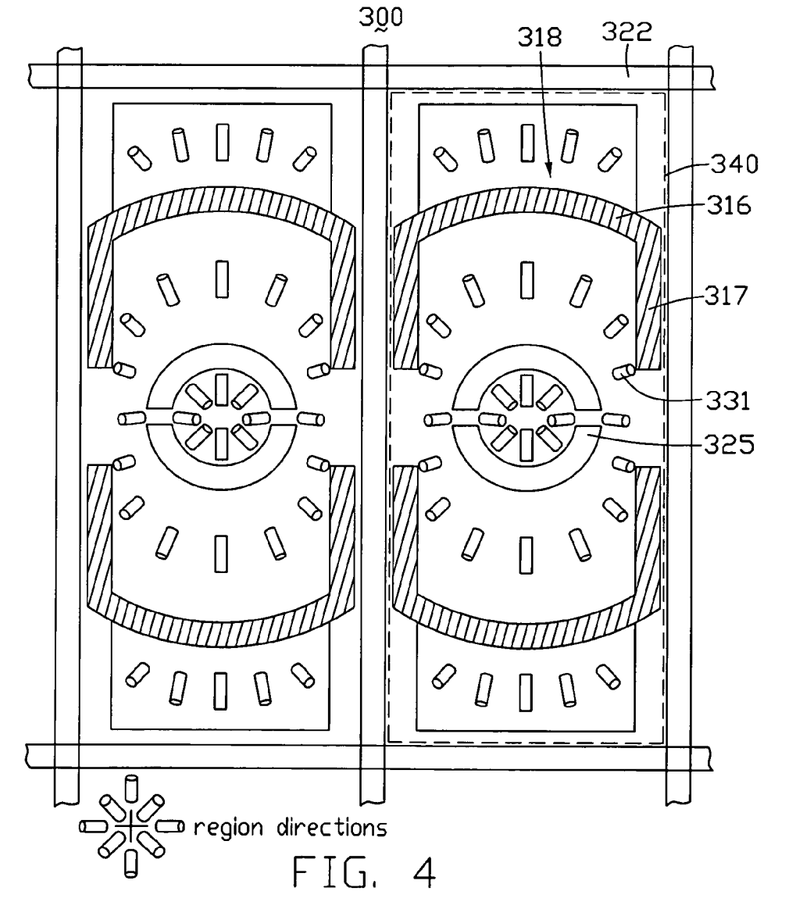
FIG. 4 illustrates a plane view of a portion of a liquid crystal panel in accordance with a second embodiment of the present disclosure.

Referring to FIG. 4, a plane view of a portion of a liquid crystal panel 300 in accordance with a second embodiment of the present disclosure is shown. The liquid crystal panel 300 is similar to the liquid crystal panel 200. However, the difference between the liquid crystal panels 300 and 200 lies in: a protrusion 318 includes a protrusion body 316 and protrusion extension portions 317 extending from two ends of the protrusion body 316. The protrusion body 316 has the same shape as the protrusion 216. The two protrusion extension portions 317 are located on two sides of a pixel element 340 and are vertical to scan lines 322. Due to the existence of the protrusion extension portions 317, one end of the long axis of each liquid crystal molecule 331 on edges of the pixel element 340 stably tilts to the protrusion extension portion 317, and the other end of the long axis of each liquid crystal molecule 331 stably tilts to a slit 325, so that the alignments of the portion of the liquid crystal molecules 331 are more stable.

Figure 5:
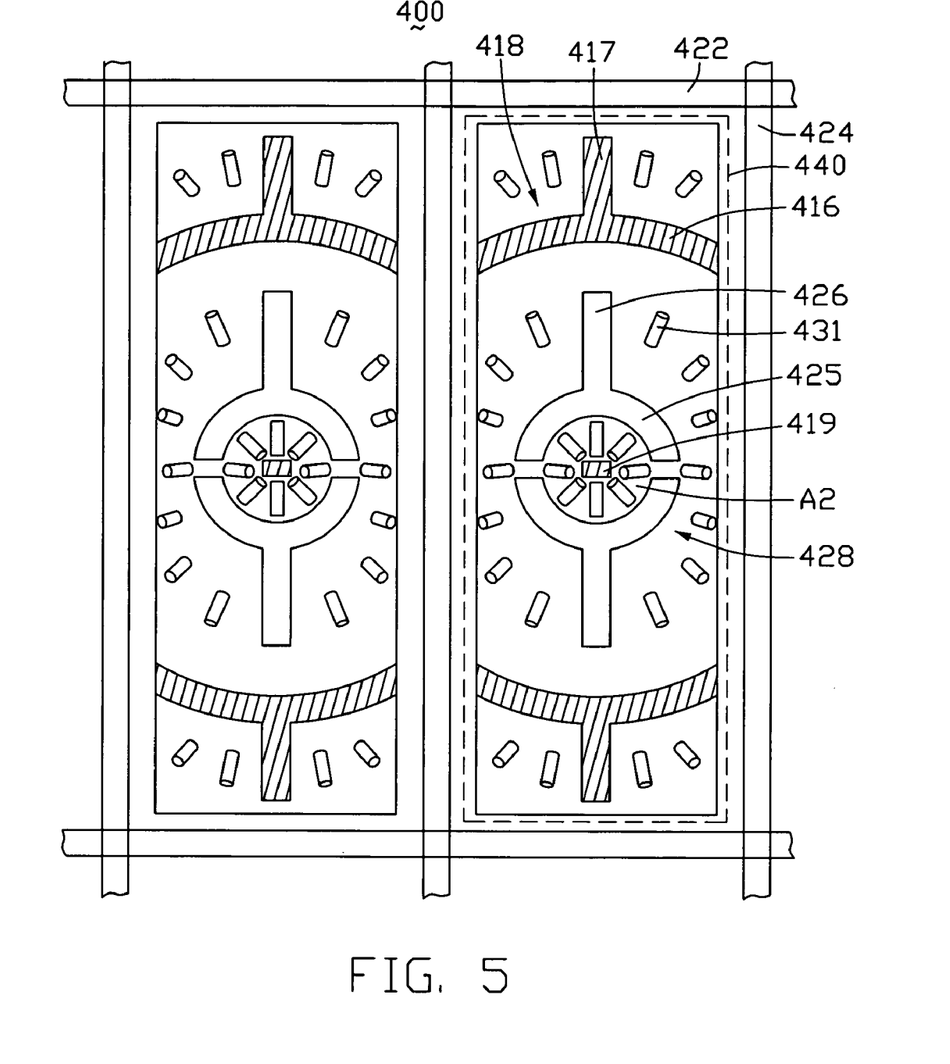
FIG. 5 illustrates a plane view of a portion of a liquid crystal panel in accordance with a third embodiment of the present disclosure.

Referring to FIG. 5, a plane view of a portion of a liquid crystal panel 400 in accordance with a third embodiment of the present disclosure is shown. The liquid crystal panel 400 is similar to the liquid crystal panel 200. However, the difference between the liquid crystal panels 400 and 200 lies in: a pixel element 440 includes two protrusions 418 and one protrusion 419; and a slit 428 includes a slit body 425 and a slit extension portion 426. Each protrusion 418 includes a protrusion body 416 and a protrusion extension portion 417. The protrusion body 416 has the same shape as the protrusion 216. The protrusion extension portion 417 extends along a direction from an arc top of protrusion body 416 to a scan line 422 and is parallel to a data line 424. The protrusion 419 has a rectangle shape and is disposed in the center of a region A2 of the pixel element 440, and the long sides of the rectangle shape are parallel to the scan lines 422, and the short sides are parallel to the data lines 424.

The slit body 425 is the same as the slit 225. The slit extension portion 426 extends along a direction from an arc top of slit body 425 to the protrusion body 416 and is parallel to the data line 424.

When a voltage is applied to the liquid crystal panel 400, with the protrusion 419, one end of the long axis of each liquid crystal molecule 431 in the region A2 stably tilts to the protrusion 419, and the other end of the long axis of each liquid crystal molecule 431 stably tilts to the slit body 425. Due to the existence of the protrusion extension portion 417 and the slit extension portion 426, the response speed of the liquid crystal molecules 431 in the pixel element 440 is faster.

Figure 6:
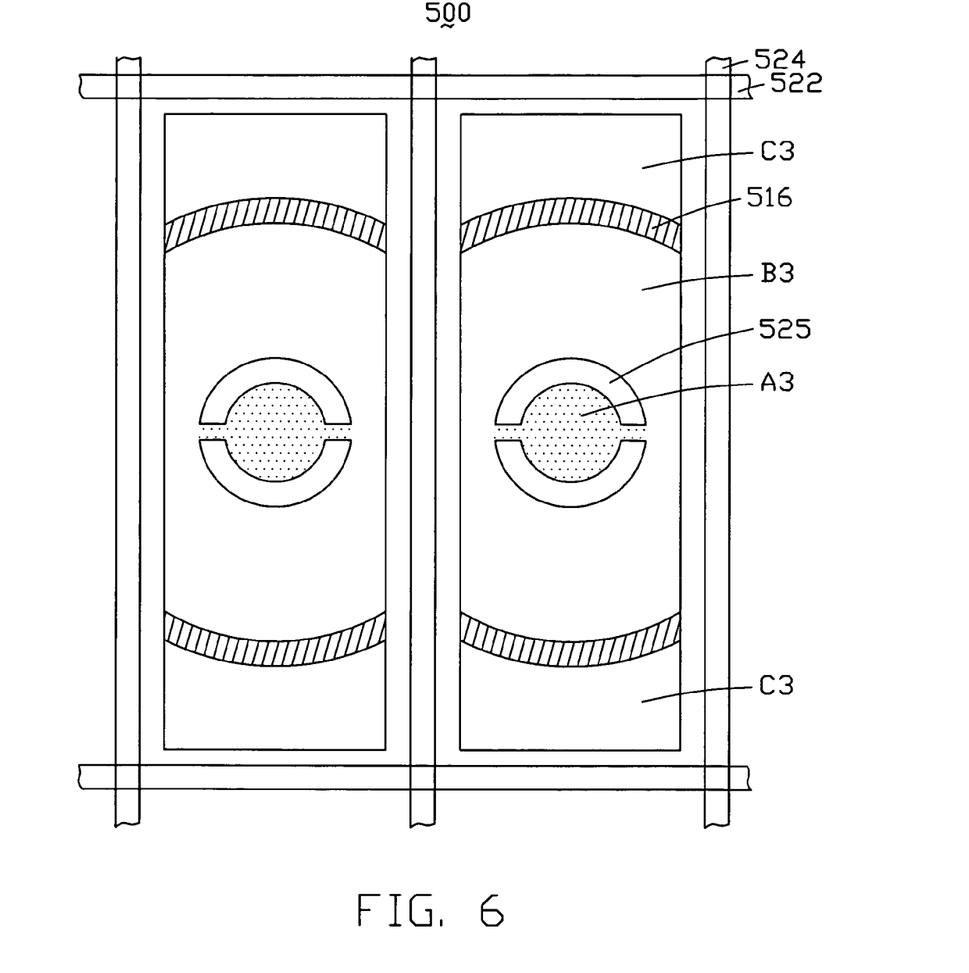
FIG. 6 illustrates a plane view of a portion of a liquid crystal panel in accordance with a fourth embodiment of the present disclosure.

Referring to FIG. 6, a plane view of a portion of a liquid crystal panel 500 in accordance with a fourth embodiment of the present disclosure is shown. The liquid crystal panel 500 is similar to the liquid crystal panel 200. However, the difference between the liquid crystal panels 500 and 200 lies in: the liquid crystal panel 500 is a transflective liquid crystal panel. A region A3 is a reflective region, and regions B3 and C3 are transmissive regions. The region A3 is surrounded by two slits 525, the region B3 is surrounded by two protrusions 516, the two slits 525 and two data lines 524, and the region C3 is surrounded by the two protrusions 516, the two data lines 524 and two scan lines 522.

Figure 7:
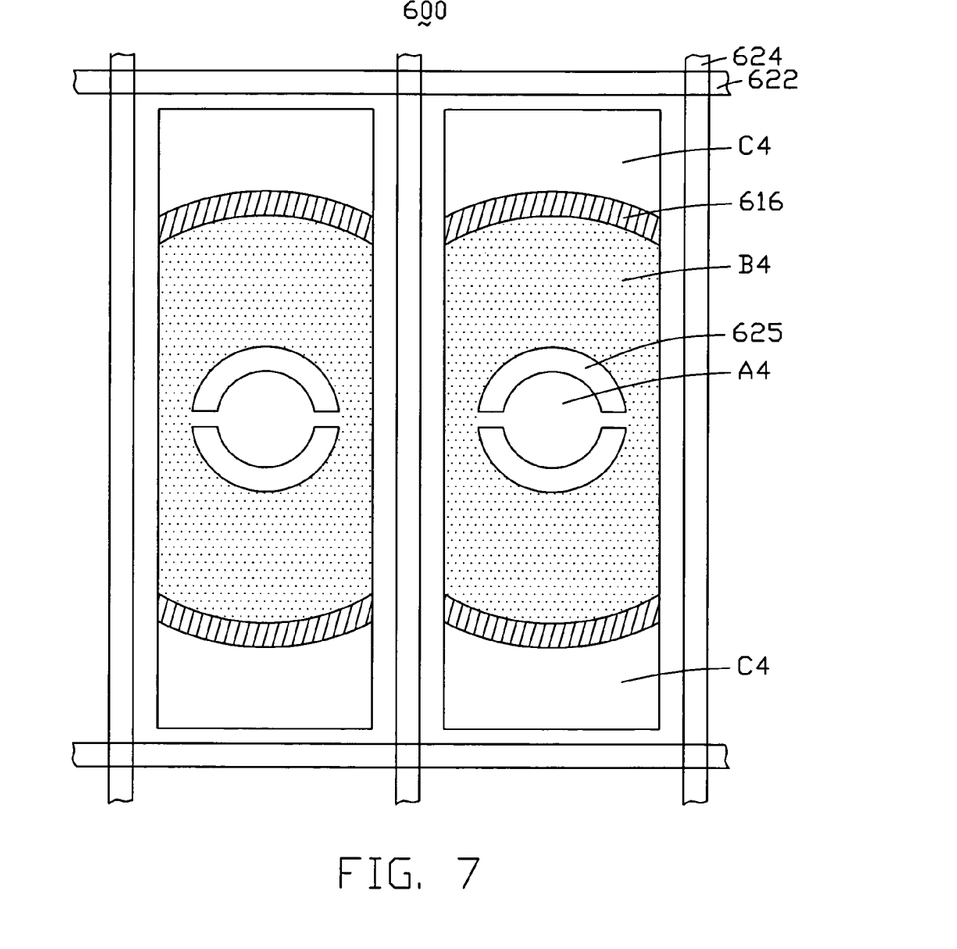
FIG. 7 illustrates a plane view of a portion of a liquid crystal panel in accordance with a fifth embodiment of the present disclosure.

Referring to FIG. 7, a plane view of a portion of a liquid crystal panel 600 in accordance with a fifth embodiment of the present disclosure is shown. The liquid crystal panel 600 is similar to the liquid crystal panel 200. However, the difference between the liquid crystal panels 600 and 200 lies in: the liquid crystal panel 600 is a transflective liquid crystal panel. A region B4 is a reflective region, and regions A4 and C4 are transmissive regions. The region A4 is surrounded by two slits 625, the region B4 is surrounded by two protrusions 616, the two slits 625 and two data lines 624, and the region C4 is surrounded by the two protrusions 616, the two data lines 624 and two scan lines 622.

Figure 8:
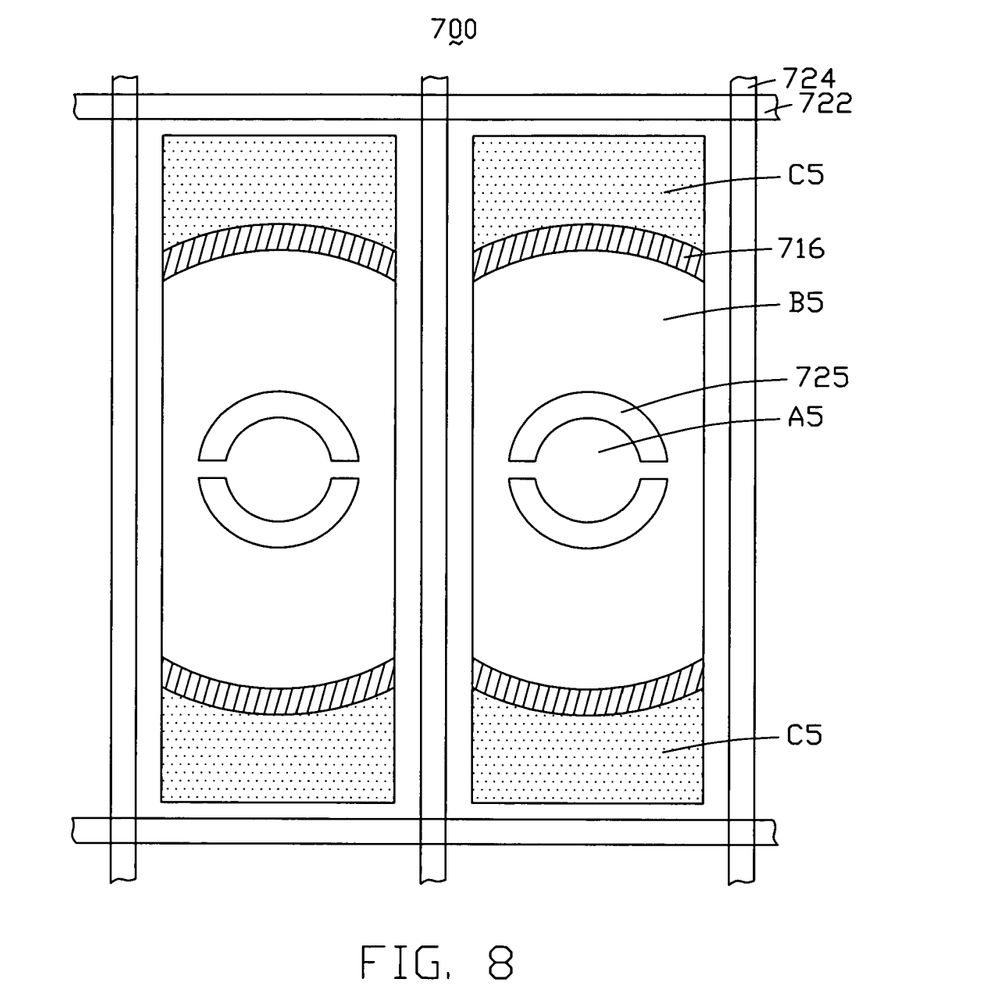
FIG. 8 illustrates a plane view of a portion of a liquid crystal panel in accordance with a sixth embodiment of the present disclosure.

Referring to FIG. 8, a plane view of a portion of a liquid crystal panel 700 in accordance with a sixth embodiment of the present disclosure is shown. The liquid crystal panel 700 is similar to the liquid crystal panel 200. However, the difference between the liquid crystal panels 700 and 200 lies in: the liquid crystal panel 700 is a transflective liquid crystal panel. A region C5 is a reflective region, and regions A5 and B5 are transmissive regions. The region A5 is surrounded by two slits 725, the region B5 is surrounded by two protrusions 716, the two slits 725 and two data lines 724, and the region C5 is surrounded by the two protrusions 716, the two data lines 724 and two scan lines 722.

Figure 9:
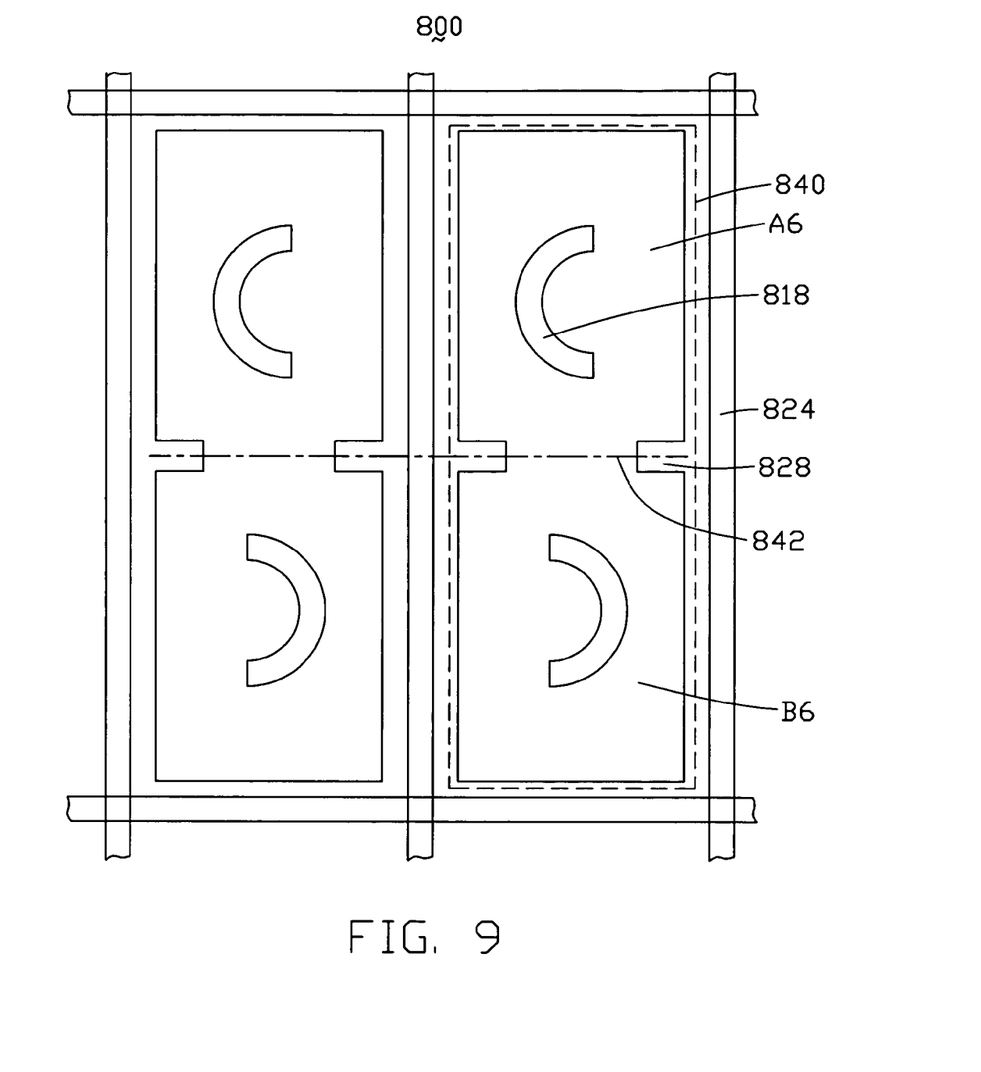
FIG. 9 illustrates a plane view of a portion of a liquid crystal panel in accordance with a seventh embodiment of the present disclosure.

Referring to FIG. 9, a plane view of a portion of a liquid crystal panel 800 in accordance with a seventh embodiment of the present disclosure is shown. The liquid crystal panel 800 is similar to the liquid crystal panel 200. However, the difference between the liquid crystal panels 800 and 200 lies in: two protrusions 818 in each pixel element 840 are disposed on two sides of a symmetry axis 842 of the pixel element 840. Two slits 828 are in a straight bar shape, and the slits 828 are disposed on two ends of the symmetry axis 842 of the pixel element 840. In each pixel element 840, the symmetry axis 842 divides the pixel element 840 into two regions, and one of the regions is referred as a region A6, and the other one of the regions is referred as a region B6.

In each pixel element 840, the protrusion 818 in the region A6 has the same shape as the protrusion 216, and the protrusion 818 is formed by anticlockwise rotating the protrusion 216 in FIG. 3 by 90 degrees. Specifically, the curve center of the protrusion 818 is adjacent to a data line 824.

Furthermore, the protrusion 818 in the region B6 has the same shape as the protrusion 216, and the protrusion 818 is formed by clockwise rotating the protrusion 216 in FIG. 3 by 90 degrees. Specifically, the curve center of the protrusion 818 is adjacent to another data line 824.

Because the two protrusions 808 of each pixel element 840 of the liquid crystal panel 800 are both arcs, the curve center of one of the protrusions 818 is adjacent to one data line 824, and the curve center of the other one of the protrusions 818 is adjacent to another data line 824, the liquid crystal molecules adjacent to the two protrusions 818 have several gradually and continuously changed alignments. Thus, when an observer views the liquid crystal panel 800 at any angle, substantially the same image displaying effect is obtained, and the displaying quality of the liquid crystal panel 800 is enhanced.

In addition, under the effect of the two protrusions 818 and the two slits 828, when a voltage is applied, one end of the long axis of each liquid crystal molecule adjacent to the symmetry axis 842 in the regions A6 and B6 tilts to the protrusions 818, and the other end of the long axis of each liquid crystal molecule tilts to the slits 828. Therefore, the liquid crystal molecules in the regions A6 and B6 have faster response speed, stable alignments and uniform arrangement.

The liquid crystal panel of the present invention may also have various alternative embodiments, for example: the protrusions 216, 318, 418, 419 and 818 can be replaced with a plurality of slits having the same shape and formed in the common electrode; or the slits 225, 325, 428 and 828 can be replaced with a plurality of protrusions having the same shape; or the protrusion 419 can be replaced with a protrusion having a bottom surface in a circle or a rhombus.

According to the aforementioned description, the present invention has conformed to the invention patent requirements, and therefore is applied for a patent according to law. However, the foregoing descriptions are merely illustrated preferred embodiments of the present invention, and the scope of the present invention is not limited to the foregoing embodiments. The appended claims are intended to include various equivalent modifications and changes that made by a person skilled in the art according to the spirit of the invention.

What is claimed is:

1. A liquid crystal panel, comprising:
    a first substrate comprising a plurality of first region-dividing structures;
    a second substrate disposed opposite to the first substrate and comprising a plurality of second region-dividing structures; and
    a liquid crystal layer sealed between the first substrate and the second substrate and comprising a plurality of liquid crystal molecules;
    wherein the first substrate, the second substrate and the liquid crystal layer form a plurality of pixel elements, each of the pixel elements is divided into a plurality of regions by the first region-dividing structures and the second region-dividing structures, the liquid crystal molecules have gradually and continuously changed alignments in at least one of the regions, the first region-dividing structures are a plurality of protrusions, the second region-dividing structures are a plurality of slits, each of the protrusions comprises a protrusion body and a pair of protrusion extension portions, each of the slits comprises a slit body, both the protrusion body and the slit body are arcs, and the protrusion extension portions linearly extend from two ends of the protrusion body.

2. The liquid crystal panel according to claim 1, wherein the first region-dividing structures on one side and on the other side of a midline of each of the pixel elements are symmetrical to a center of the pixel element, and the second region-dividing structures on the one side and on the other side of the midline are symmetrical to the center of the pixel element.

3. The liquid crystal panel according to claim 2, wherein each of the arcs comprises an inner arc boundary, an outer arc boundary, and an arc midline running midway between the inner arc boundary and the outer arc boundary, and an included angle between a normal line of the arc midline and a horizontal direction is between 0° and 180°.

4. The liquid crystal panel according to claim 2, wherein the second substrate comprises a plurality of scan lines along a horizontal direction, and a plurality of data lines vertically intersected and isolated from the scan lines.

5. The liquid crystal panel according to claim 4, wherein the protrusion extension portions are parallel to the data lines.

6. The liquid crystal panel according to claim 2, wherein a transverse width of each of the arcs is about 10 μm.

7. A liquid crystal panel, comprising:
    a first substrate comprising a plurality of first region-dividing structures;
    a second substrate disposed opposite to the first substrate and comprising a plurality of second region-dividing structures; and
    a liquid crystal layer sealed between the first substrate and the second substrate and comprising a plurality of liquid crystal molecules;
    wherein the first substrate, the second substrate and the liquid crystal layer form a plurality of pixel elements, each of the pixel elements is divided into a plurality of regions by the first region-dividing structures and the second region-dividing structures, the liquid crystal molecules have gradually and continuously changed alignments in at least one of the regions, the first region-dividing structures are a plurality of protrusions, the second region-dividing structures are a plurality of slits, each of the slits comprises a slit body and a slit extension portion, each of the protrusions comprises a protrusion body and a protrusion extension portion, both the protrusion body and the slit body are arcs, the slit extension portion linearly extends from the slit body, the protrusion extension portion linearly extends from the protrusion body, and the slit extension portion and the protrusion portion are located on a same imaginary straight line.

8. The liquid crystal panel according to claim 7, wherein the first region-dividing structures on one side and on the other side of a midline of each of the pixel elements are symmetrical to a center of the pixel element, and the second region-dividing structures on the one side and on the other side of the midline are symmetrical to the center of the pixel element.

9. The liquid crystal panel according to claim 8, wherein each of the arcs comprises an inner arc boundary, an outer arc boundary and an arc midline running midway between the inner arc boundary and the outer arc boundary, and an included angle between a normal line of the arc midline and a horizontal direction is between 0° and 180°.

10. The liquid crystal panel according to claim 8, wherein the second substrate comprises a plurality of scan lines along a horizontal direction, and a plurality of data lines vertically intersected and isolated from the scan lines.

11. The liquid crystal panel according to claim 10, wherein the protrusion extension portion and the slit extension portion are parallel to the data lines.

12. The liquid crystal panel according to claim 11, wherein the slit extension portion extends from an arc top of the slit body toward a corresponding scan line, and the protrusion extension portion extends from an arc top of the protrusion body toward the corresponding scan line.

13. The liquid crystal panel according to claim 8, wherein a transverse width of each of the arcs is about 10 μm.

* * * * *